United States Patent
Bausenwein et al.

(10) Patent No.: US 7,466,473 B2
(45) Date of Patent: Dec. 16, 2008

(54) 2-CHANNEL DISPLAY SYSTEM COMPRISING MICRO ELECTRO MECHANICAL SYSTEMS

(76) Inventors: Bernhard Rudolf Bausenwein, Eichenstr. 32, Hagelstadt, Bavaria (DE) D-93095; Max Mayer, Hutstr. 39, Forchheim, Bavaria (DE) D-91301

( * ) Notice: Subject to any disclaimer, the term of this patent is extended or adjusted under 35 U.S.C. 154(b) by 0 days.

(21) Appl. No.: 11/716,641

(22) Filed: Mar. 12, 2007

(65) Prior Publication Data

US 2007/0159680 A1      Jul. 12, 2007

Related U.S. Application Data

(62) Division of application No. 11/017,916, filed on Dec. 22, 2004, now Pat. No. 7,403,320.

(30) Foreign Application Priority Data

Dec. 29, 2003   (DE)   ................. 103 61 915

(51) Int. Cl.
*G02B 26/00*    (2006.01)
*G02B 27/10*    (2006.01)
(52) U.S. Cl. ................. 359/290; 359/292; 359/618; 359/640
(58) Field of Classification Search ................. 359/290, 359/291, 292, 298, 283, 242, 251, 267, 618, 359/629, 639, 640
See application file for complete search history.

(56) References Cited

U.S. PATENT DOCUMENTS

| 5,600,383 A | 2/1997 | Hornbeck |
| 5,638,142 A | 6/1997 | Kavanagh et al. |
| 5,921,650 A | 7/1999 | Doany et al. |
| 6,250,763 B1 | 6/2001 | Fielding et al. |

FOREIGN PATENT DOCUMENTS

WO   WO 01/37029   5/2001

*Primary Examiner*—Ricky L Mack
*Assistant Examiner*—Brandi N Thomas

(57) ABSTRACT

The 2-channel display system with micro electromechanical systems (MEMS, e.g. DMDs from Texas Instruments) simultaneously generates a right and a left image in two discrete modulation channels, which differ by the polarization of their light beams. More specifically, the invention relates to the chirality (handedness) of MEMS and the geometric problems associated with this handedness in superposition systems. In this application we uncover a solution to superpose the images modulated by identical MEMSs (imagers of the same isomer type) without additional mirroring.

16 Claims, 5 Drawing Sheets

FIG.4E

2-CHANNEL DISPLAY SYSTEM COMPRISING MICRO ELECTRO MECHANICAL SYSTEMS

CROSS-REFERENCE TO RELATED APPLICATIONS

This is a divisional application of patent application U.S. Ser. No. 11/017,916 published as US2005/0141076.

2-Channel Display System Comprising Micro Electro Mechanical Systems U.S. Ser. No. 11/017,916

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention uncovers a two channel stereo display, which simultaneously generates a right and left image in discrete modulation channels, which differ by the polarization of their light beams. The invention relates to display and projection systems using micro electro mechanical systems (MEMS) as displays. More specifically, the invention relates to the chirality (handedness) of deflectable micro mirror devices (DMD) and uncovers solutions for some of the geometric problems associated with this handedness in stereoscopic systems.

A polarization coded 2 channel stereo display system requires two spatially separated and different linearly polarized light beams which are simultaneously modulated by at least two SLMs upstream to the superposition system (polarization combiner). When two polarized beams are combined, one light beam ("S" polarized light) is folded into the other ("P" polarized light), the direction of which remains unchanged. This is common to all polarization combiners (PBS, e.g. MacNeille beam splitters; wire grid polarizers WGP, Moxtek Inc, UT, USA). The folding corresponds to an image reflexion. As the modulation task of the SLMs takes place upstream of the superposition and only one beam is reflected (mirrored), one of the two SLMs has to create the reflected image. This can easily be achieved for liquid crystal SLMs by mirror symmetrically addressing the modulators of the two channels. Light is incident on these LC modulators with an incidence angle of 0° (perpendicular to the surface of the modulator). Light paths therefore are not influenced by rotation or mirroring.

Obviously MEMS can also be addressed mirror symmetrically. However MEMSs of the state of the art (e.g. DMDs by Texas Instruments) do not show any axes of symmetry considering their overall operation. Only the "On" beam is reflected perpendicular to the modulator surface. The incident beam however is directed perpendicular to the mirror deflection axis, which is rotated by 45° to the image raster. It also reaches the display under an angle of twice the deflection angle of a single mirror (FIG. 1). Thus, with a single DMD type as described no symmetrical light paths are possible.

A DMD with a 3×4 matrix is shown in FIG. 2a (this corresponds to the predominant width/height ratio of 4/3). Single mirrors (17) rotate around a deflection axis which has an angle of 45° relative to the raster image. In FIG. 2b the single mirror deflection axes are visible after "removing" the mirrors. The center DMD corresponds to the state of the art type from Texas Instruments (U.S. Pat. No. 5,600,383). While the raster image shows internal symmetry, this is no longer the case if the orientation of the mirror deflection axis is taken into account. For overall operation no internal symmetry exists. After any mirroring (only horizontal and vertical mirroring is shown) this central "L" topology is converted into a single "R" topology. Due to their rectangular shape and to the orientation of the mirror deflection axes, which are rotated 45° to the image raster, these MEMS show stereo isomerism. Stereo isomerism is characterized by the existence of two different topologies which are mirror symmetric and cannot be transformed into each other by rotation.

In the prior art, when more than one MEMS is used (e.g. color generation in 3-chip designs) the second stereo-isomeric type is optically mimicked by using an additional reflection surface. This results either in equalizing the number of reflections downstream the MEMSs (e.g. Kavanagh et al., U.S. Pat. No. 5,638,142) or having an even-numbered difference of the number of reflections downstream the MEMSs (e.g. Fielding et al., U.S. Pat. No. 6,250,763). This was enforced by using the same physical layer for splitting and combining the input and ON-beams. In these arrangements, the mirror deflection axes of the single mirrors of all MEMSs are coplanar to the plane of superposition.

In our application U.S. Ser. No. 11/017,916 we have uncoupled split and combine systems (e.g. FIG. 3), allowing us to find new solutions. In this application we focus on a solution to superpose the modulated image of two stereo-isomeric MEMSs of the some topological type without additional reflection surface downstream the MEMSs by certain rotatory arrangements of the two MEMSs.

BRIEF SUMMARY OF THE INVENTION

FIGS. 3 and 4 show the first embodiment of this application. FIG. 3 is an exploded view of the central components shown in FIG. 4D, demonstrating the light paths and basic operational features. Only one type of the stereo-isomeric MEMS topologies is used (as an example "L" was chosen for MEMS1 and MEMS2 (1,2)). In this exemplary arrangement, light paths in both channels are directed such that the plane of incidence $T1_{POI}$ (formed by the incident and reflected beams of the TIRs) is perpendicular to the plane of incidence $P2_{POI}$ (26) formed by the incident and reflected beams of the PBS (6). The plane of incidence $T2_{POI}$ is parallel to the plane of incidence $P2_{POI}$ (26). A complete superposition (respectively total overlap of the imager fields) is possible with a single stereo-isomeric type and without an additional reflecting surface, resulting in an odd-numbered difference of the number of reflections downstream the MEMSs. The unique characteristic of the invention is clearly seen in the relative orientation of the mirror deflexion axes of the two MEMSs in the superposition image: The virtually projected mirror deflection axes (21) in the superposed image (22) of the two MEMSs (1 and 2) are perpendicular in this embodiment.

The shown arrangement can be varied by rotations of the two MEMSs around their optical ON-axes as long as the described relation of the mirror deflection axes in the superposition image is kept.

DETAILED DESCRIPTION OF THE INVENTION

Figure 1:
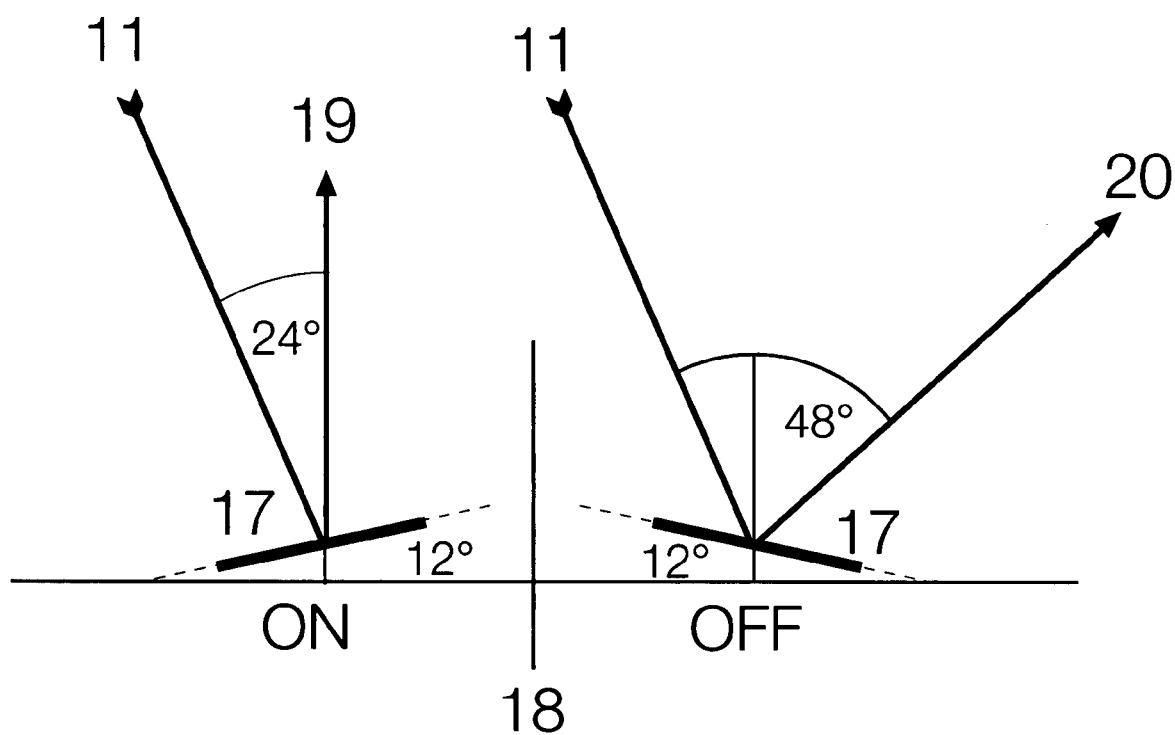
FIG. 1 is a schematic diagram illustrating the operation of a MEMS (DMD).
Figure 2A:
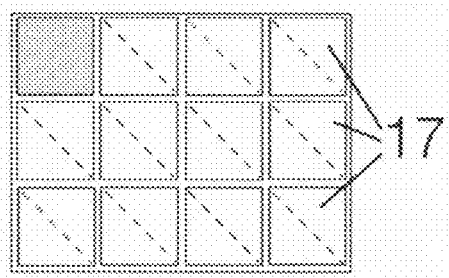
FIG. 2 shows the stereo isomeric topology of MEMS according to the state of the art.
Figure 2B:
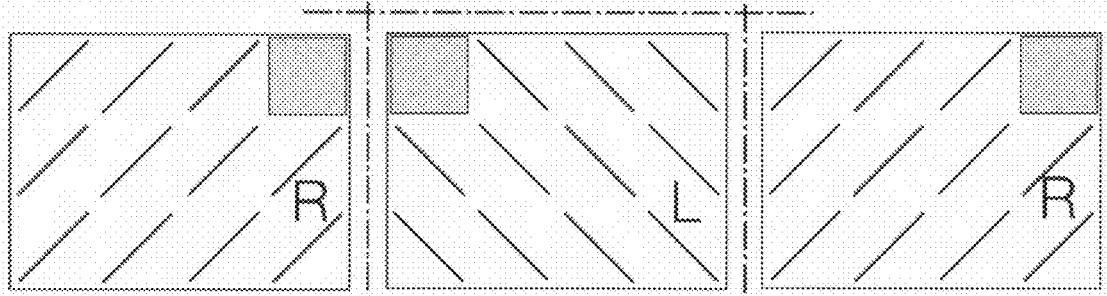

For the sake of simplicity the figures are labeled in a way that identical numbers indicate identical components in all figures. MEMS 1 (1); MEMS 2 (2); TIR 1 (3); TIR 2 (4); PBS 1 (5); PBS 2 (6); WGP (7); deflection mirror or TIR (8); cleanup polarizer for "S"-light (9); cleanup polarizer for "P"-light (10); incident beam (11); reflected "On" beam (12); channel 1 (13); channel 2 (14); dump: "Off-light" channel 1 (15); dump: "Off-light" channel 2 (16); single deflectable mirror (17); normal (18); "On"-beam (19); "Off"-beam (20); mirror deflection axis (21); superimposed image (22); trichroic prism assembly (TPA) for color separation/color recombination in channel 1 (23); TPA in channel 2 (24); polarization conversion system PCS (25); plane of incidence of the polarizing beam splitter ($P_{POI}$, 26). In FIG. 4 a small circle marks positions, where a light beam is deflected in a direction perpendicular to the drawing plane.

Figure 3:
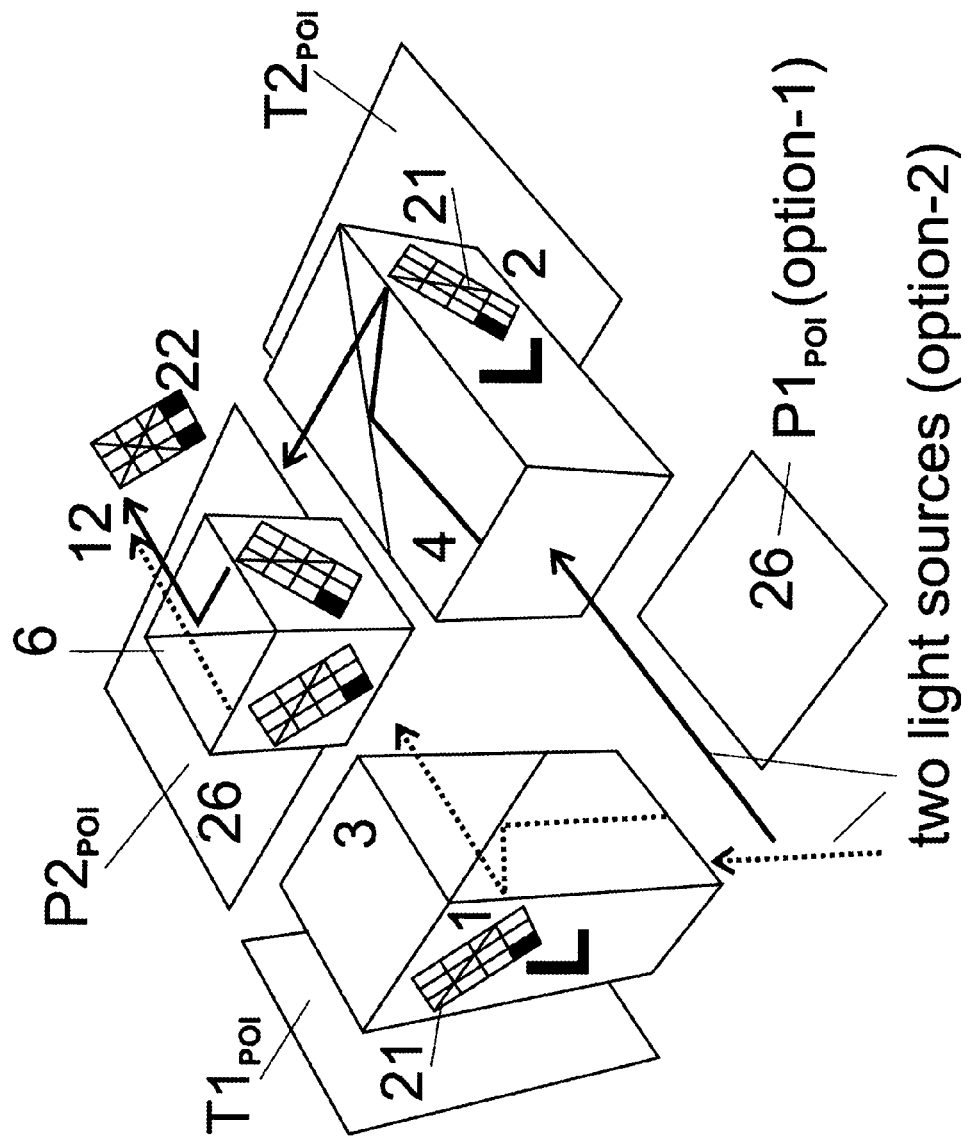
FIG. 3 shows the operational principle of this application underlying the embodiment shown in FIGS. 4 and 5. This arrangement uses only one type of stereo isomer.
Figure 4A:
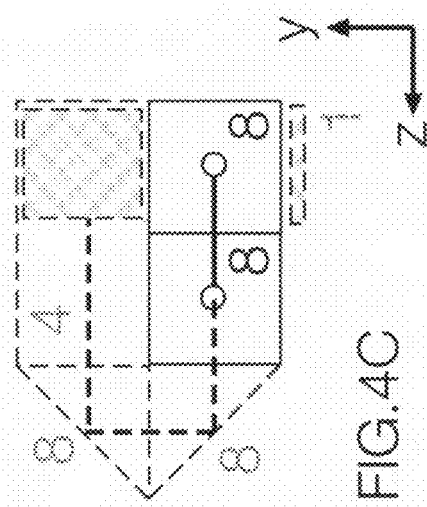
FIG. 4 shows a schematic view of a first embodiment of the invention, an arrangement of beam splitters and TIRs with asymmetric light paths and two MEMS of only one topology, where the TIR prisms are arranged such that their planes of incidence are perpendicular to each other (stereo wing with perpendicular TIRs).
Figure 4B:
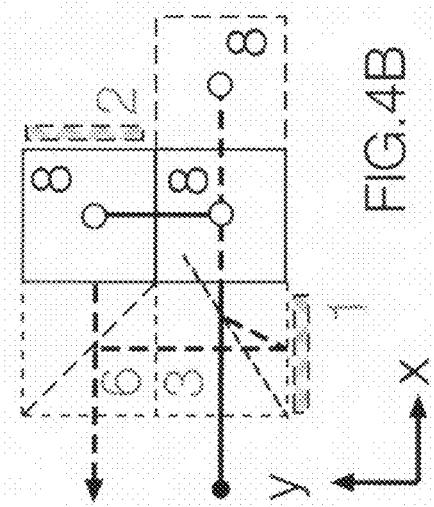
Figure 4C:
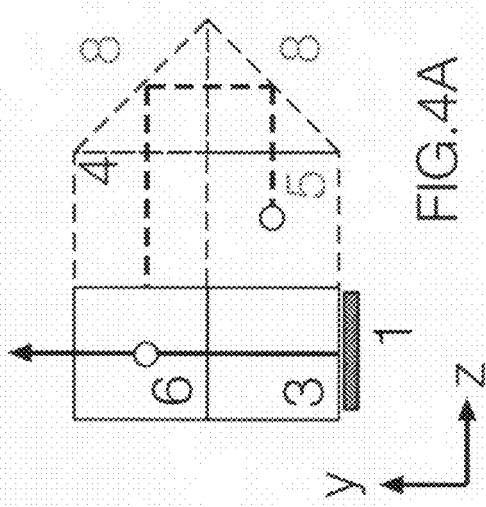
Figure 4D:
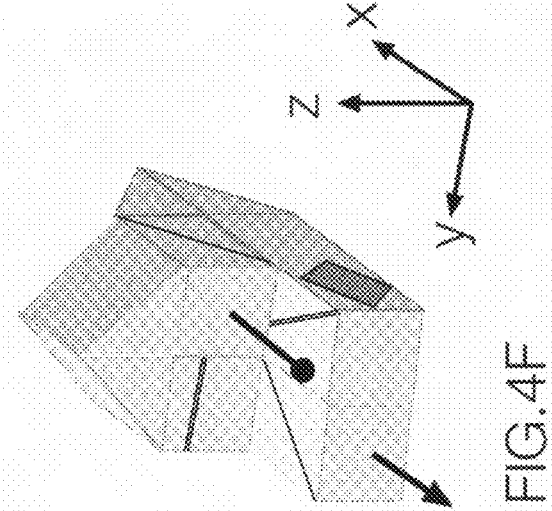
Figure 4F:
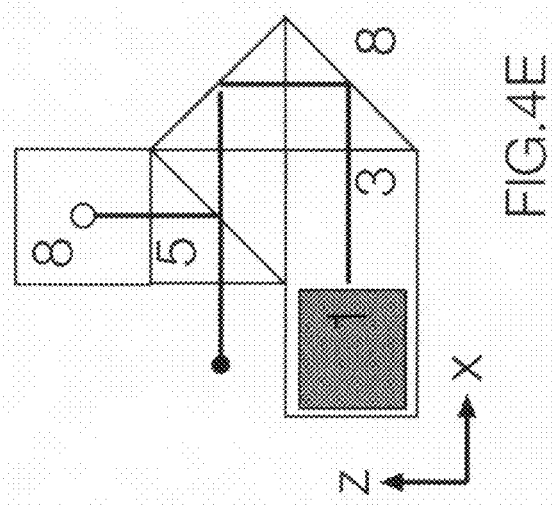

FIG. 3 shows the operational features of the invention. Two spatially separated and linearly polarized light beams ("S" and "P" polarization states are indicated by stippled and dashed lines) feed the system, resulting in two simultaneously modulated channels. They may be derived either from a single light source split by a first beam splitter (P1, with plane of incidence $P1_{POI}$, 26) or can be derived from two light sources. Both polarized beams are then directed in the system onto two spatial light modulators (1 and 2, SLMs, e.g. DMDs) in two functionally identical modules. In the setup shown in FIG. 4 only a single topology is employed (e.g. "L"). For the light guidance to and fro the MEMSs (1, 2) FIG. 3 shows the use of TIRs T1 (3) and T2 (A) with their planes of incidence $T1_{POI}$ and $T2_{POI}$. The said SLMs, shown are DMDs, modulate the incident beam (11) by a different mirror deflection in the "On" versus the "Off" state of a pixel. "On" pixel light is reflected in the normal of the DMD surface. Modulated "On" beams are recombined in a second beam splitter element (6).

As was shown in our application U.S. Ser. No. 11/017,916, a polarization conversion system (25) can be attached to the setup (e.g. an achromatic quarter wave plate). In combination with adapted passive stereo goggles for circularly polarized light, a rotation of the head around the roll axis will then influence no more channel separation.

It is appreciated that while the drawing shows a perpendicular angle between the channels resulting from the use of a MacNeille type PBS, other angles between the channels are possible if other types of beam splitters (e.g. wire grid polarizers WGP) are used for beam combining. While in FIG. 3 $T1_{POI}$ is perpendicular to $T2_{POI}$, other angles between these POIs are possible. Independent of these angles, and as a common difference to our solution using a MEMS stereoisomeric pair, the deflection axes of the single mirrors (MDAs) of the two channels are perpendicular to each other (22) in their virtual image projected into the superposed image.

FIG. 4 shows a schematic view of the first invention (stereo wing with perpendicularly arranged TIRs). It uses two MEMSs of only one typology ("L"-type). FIG. 4 shows this embodiment of the invention in a top view (FIG. 4b), three side views (FIG. 4a, c, d) and an isometric scheme (FIG. 4e). Beams in the uppermost layers of the views are shown in solid lines, while a dashed line indicates beams in lower planes. Optical axes perpendicular to the drawing plane (paper plane) are indicated by a small circle. FIG. 4d shows the core of this embodiment with two TIRs and the superposition PBS: the two TIR prisms are arranged in a way that their planes of incidence ($T1_{POI}$, $T2_{POI}$) are perpendicular (their cutting angle is 90°). With this use of asymmetric light feed a complete overlap of the two subimages generated by the two SLMs is obtained although they are of the same topology. (Note that in a virtual superposition image of the mirror deflection axes of MEMS (1) and (2), indicated in FIG. 4d, one would see them perpendicularly arranged. Light paths of the two channels are arranged in a way that the $T1_{POI}$ (and the POI of MEMS 1) is parallel to the $P2_{POI}$ of the superposition PBS (6) whereas the $T2_{POI}$ (and the POI of MEMS 2) is perpendicular to $P2_{POI}$. FIG. 4f shows an isometric view of the total arrangement. Polarizing splitter (5) and polarizing combiner (6) are rotated by 90° relative to each other (the polarizing layer of PBS 5 is parallel to the y-axis, while the polarizing layer of PBS 6 is parallel to the z-axis). FIG. 4b shows a top view and FIGS. 4a, c, e show corresponding side views from different points of view indicated by the coordinate axes of their view planes.

Figure 5:
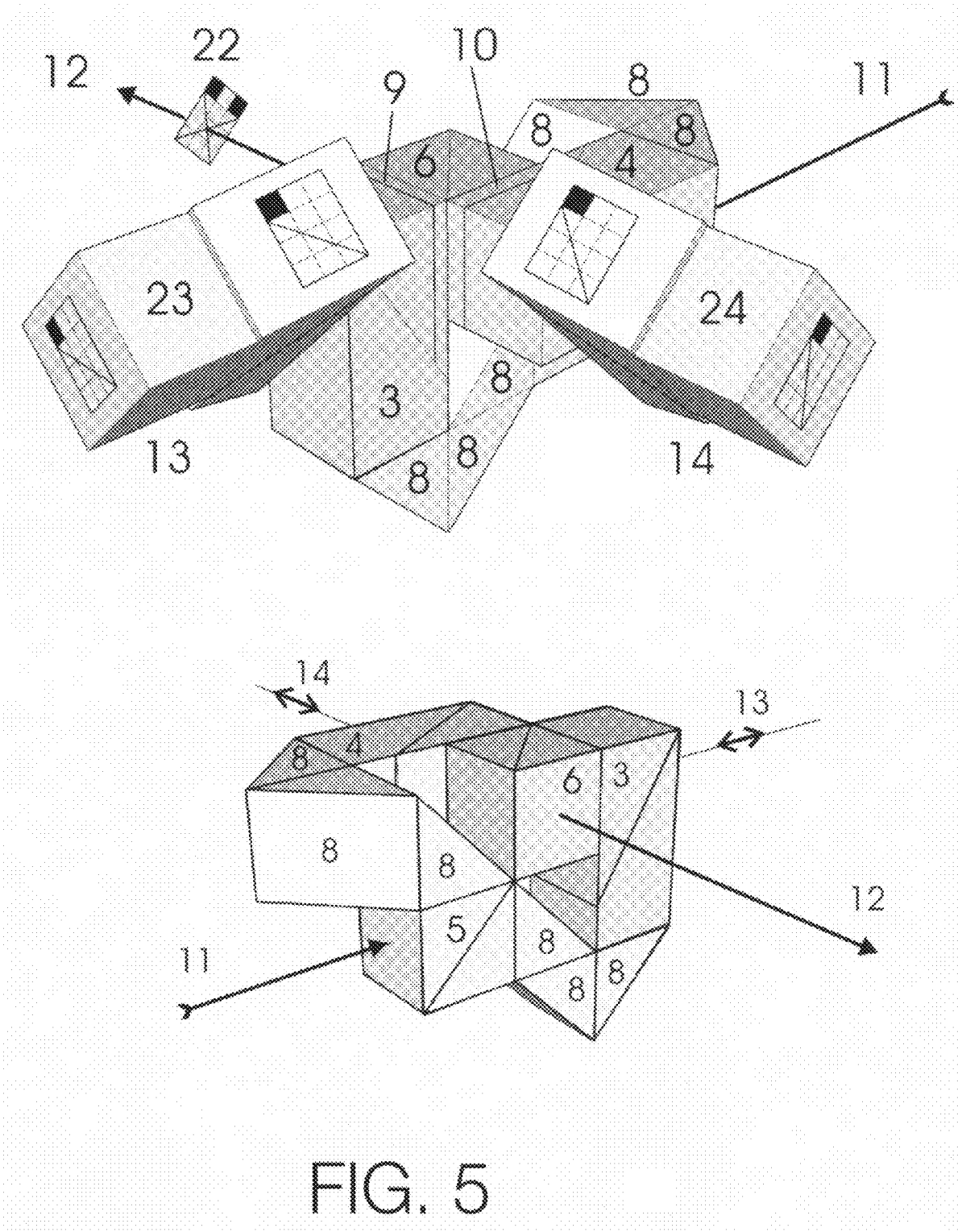
FIG. 5 shows a second embodiment of the invention, an arrangement of beam splitters and TIRs with asymmetric light paths and six MEMS of only one topology (stereo wing with perpendicularly arranged TIRs and simultaneous color generation).

FIG. 5 shows a schematic view of the second embodiment of our invention (folded stereo wing with perpendicularly arranged TIRs and simultaneous color generation). This embodiment is a slightly enhanced version of the embodiment shown in FIG. 4. Instead of only one MEMS per channel a TPA with three MEMSs per channel is used. The incident beam (11) is split by the PBS (5) into two subbeams and directed via three mirrors (8) in each of the two channels (13, 14) to the perpendicularly arranged TIRs (3, 4). From there the beams are directed to the TPAs (23, 24) for color separation. The modulated "On"-beams are then color combined in the same TPA and superposed by PBS (6). Like in FIG. 4, in a virtual superposition image of the mirror deflection axes of MEMS (1) and (2), one sees them perpendicularly arranged. Optional means for correcting skew rays or other polarization impurities (9, 10) are inserted upstream of superposition in both channels (e.g. "polar correct" from Colorlink Inc, CO., USA).

A minimum projective display system in accordance to our invention may comprise at least one light source, means for sequential color generation, integrating means for homogenizing light, our 2 channel image display system core with two MEMSs, and a projection lens. Sequential color generation may be realized by a color wheel (e.g. Sequential Color Recapture SCR or color wheel, e.g. from Optical Coating Laboratory Inc, OCLI, CA, USA or a "High efficiency field sequential color wheel" after U.S. Pat. No. 5,921,650). In contrast to these mechanically color switching methods, sequential color generation could also be realized by electronically switching color systems (e.g. ColorSwitch from ColorLink, CO, USA) or similar systems.

Our embodiments are, however, also suitable for highest quality systems with simultaneous color generation (e.g., three MEMSs in each channel) as shown in an exemplary illustration in FIG. 5.

It will be appreciated that whilst this invention is described by way of detailed embodiments, these realizations serve as illustrations of the invention but not as a limitation of the invention; numerous variations in form and detail can be deduced by those skilled in the art or science to which the invention pertains without leaving the scope of the invention as defined by the following claims:

The invention claimed is:

1. A 2-channel display system comprising
    two spatially separate channels, simultaneously feeding two polarization coded images into a common light path out of which said images may be separated by a polarization decoding system;
    light of at least one light source, comprising at least 3 spectral components, which are sufficient to span a color space, feeding the two channels;
    a polarization split system $PBS_1$ with a plane of incidence $P1_{POI}$, generating two spatially separated light beams of a different linear polarization feeding the two channels;
    SLMs (spatial light modulators) which are MEMSs (Micro Electro Mechanical System), at least one in each channel, characterized by modulating light via the direction of the reflection of the incident light beam;
    MEMSs positioned such that the axis of the incident light beam differs from the axis of the modulated "ON"-light beam, the modulated "ON" beam being reflected normal to the MEMS surface;
    a polarization combining system $PBS_2$ with a plane of incidence $P2_{POI}$ for superimposing the two spatially modulated "ON" light beams of each channel into a common "ON" light beam, said $PBS_2$ being spatially separated from $PBS_1$;
    MEMSs rotated so that the mirror deflection axes of the MEMSs of the two channels are perpendicular in their virtual projection in the superposition image.

2. A 2-channel display system comprising
    two spatially separate channels, simultaneously feeding two polarization coded images into a common light path out of which said images may be separated by a polarization decoding system;
    light of at least two light sources, comprising at least 3 spectral components, which are sufficient to span a color space, feeding the two channels;
    polarization conversion systems, generating two spatially separated light beams of a different linear polarization feeding the two channels;
    SLM (spatial light modulators) which are MEMSs (Micro Electro Mechanical System), at least one in each channel, characterized by modulating light via the direction of the reflection of the incident light beam;
    MEMSs positioned such that the axis of the incident light beam differs from the axis of the modulated "ON"-light beam, the modulated "ON" beam being reflected normal to the MEMS surface;
    a polarization combining system $PBS_2$ with a plane of incidence $P2_{POI}$ for superimposing the two spatially modulated "ON" light beams of each channel into a common "ON" light beam, said $PBS_2$ being spatially separated from the polarization conversion systems;
    MEMSs rotated so that the mirror deflection axes of the MEMSs of the two channels are perpendicular in their virtual projection in the superposition image.

3. A 2-channel display system according to claim 1 with additional means for folding the light paths in the channels, at least 1 in each channel, additional to the reflection of the MEMSs, and additional to the folding in said superposition system.

4. A 2-channel display system according to claim 3, said means for folding being TIRs with planes of incidence $T1_{POI}$ and $T2_{POI}$;
    said $T1_{POI}$ and $T2_{POI}$ being perpendicular;
    one $P_{POI}$ being parallel to one $T_{POI}$.

5. A 2-channel display system according to claim 1 using a polarization conversion system transforming the linearly polarized light into circularly polarized light, one channel comprising left, the other right circular polarization.

6. A 2-channel display system according to claim 1 using polarization correction systems upstream to the superposition.

7. A 2-channel display system according to claim 1 using stereoscopic information to control the MEMSs of the two channels.

8. A 2-channel display system according to claim 1 comprising
    a body;
    means to generate colors sequentially;
    one MEMS display in each channel;
    a projection lens.

9. A 2-channel display system according to claim 1 comprising
    a body;
    means to generate colors simultaneously;
    more than one MEMS display in each channel;
    a projection lens.

10. A 2-channel display system according to claim 2 with additional means for folding the light paths in the channels, at least 1 in each channel, additional to the reflection of the MEMSs, and additional to the folding in said superposition system.

11. A 2-channel display system according to claim 10, said means for folding being TIRs with planes of incidence $T1_{POI}$ and $T2_{POI}$;
    said $T1_{POI}$ and $T2_{POI}$ being perpendicular.

12. A 2-channel display system according to claim 2 using a polarization conversion system transforming the linearly polarized light into circularly polarized light, one channel comprising left, the other right circular polarization.

13. A 2-channel display system according to claim 2 using polarization correction systems upstream to the superposition.

14. A 2-channel display system according to claim 2 using stereoscopic information to control the MEMSs of the two channels.

15. A 2-channel display system according to claim 2 comprising
    a body;
    means to generate colors sequentially;
    one MEMS display in each channel;
    a projection lens.

16. A 2-channel display system according to claim 2 comprising
    a body;
    means to generate colors simultaneously;
    more than one MEMS display in each channel;
    a projection lens.

* * * * *